(12) United States Patent
Lan et al.

(10) Patent No.: US 8,321,869 B1
(45) Date of Patent: Nov. 27, 2012

(54) SYNCHRONIZATION USING AGENT-BASED SEMAPHORES

(75) Inventors: Junqiang Lan, Santa Clara, CA (US); Li Sha, San Jose, CA (US); Zhijian Lu, Fremont, CA (US); Ye Zhou, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 606 days.

(21) Appl. No.: 12/533,308

(22) Filed: Jul. 31, 2009

Related U.S. Application Data

(60) Provisional application No. 61/085,715, filed on Aug. 1, 2008, provisional application No. 61/085,989, filed on Aug. 4, 2008.

(51) Int. Cl.
*G06F 9/46* (2006.01)
*G06F 12/00* (2006.01)
*G06F 13/22* (2006.01)

(52) U.S. Cl. ........ 718/102; 718/104; 710/200; 710/220; 710/240

(58) Field of Classification Search ................. 718/102
See application file for complete search history.

(56) References Cited

U.S. PATENT DOCUMENTS

| | | | | |
|---|---|---|---|---|
| 6,009,275 A | * | 12/1999 | DeKoning et al. | 710/220 |
| 6,070,194 A | * | 5/2000 | Yu et al. | 709/229 |
| 6,279,066 B1 | * | 8/2001 | Velingker | 710/240 |
| 6,725,457 B1 | * | 4/2004 | Priem et al. | 718/104 |
| 7,650,453 B2 | * | 1/2010 | Torii | 710/240 |
| 2003/0140189 A1 | * | 7/2003 | Bogin et al. | 710/240 |
| 2004/0215858 A1 | * | 10/2004 | Armstrong et al. | 710/200 |

* cited by examiner

*Primary Examiner* — Jennifer To

(57) ABSTRACT

The present specification describes techniques and apparatus that enable synchronization using agent-based semaphores. In one or more implementations, a semaphore is used for a first agent to notify a second agent that the first agent has completed a particular task of a set of tasks and has completed using a shared resource for the particular task.

20 Claims, 8 Drawing Sheets

SYNCHRONIZATION USING AGENT-BASED SEMAPHORES

RELATED APPLICATIONS

This application claims priority under 35 U.S.C. §119(e) to U.S. Provisional Patent Application Ser. No. 61/085,989, filed on Aug. 4, 2008, the disclosure of which is incorporated by reference herein in its entirety. This application also claims priority under 35 U.S.C. §119(e) to U.S. Provisional Patent Application Ser. No. 61/085,715, filed on Aug. 1, 2008, the disclosure of which is incorporated by reference herein in its entirety.

BACKGROUND

Computing devices typically operate based on execution of instructions, and these instructions are oftentimes executed as different processes or threads. These different processes or threads operate together to provide the desired functionality for the computing device. Situations can arise in such computing devices where a particular resource of the computing device (such as memory) is shared by the different processes or threads, and different ones of the processes or threads can attempt to access the shared resource at approximately the same time. However, such accesses to a shared resource can create problems. For example, if one process or thread reads data that it expects to have been placed in memory by a second process or thread, but performs the reading before that second process or thread places the correct data in memory, then the data read by the process or thread will be incorrect. This can lead to the threads and processes operating in an incorrect and/or erratic manner, resulting in the computing device not providing the desired functionality.

SUMMARY

This Summary is provided to introduce subject matter that is further described below in the Detailed Description. Accordingly, the Summary should not be considered to describe essential features nor used to limit the scope of the claimed subject matter.

A method implemented in a first agent of a device is described. The method includes checking a first agent-based semaphore that is updated by a second agent of the device, and determining whether the first agent-based semaphore has been updated to a desired value. The method further includes if the first agent-based semaphore has not been updated to the desired value, then waiting until the first agent-based semaphore is updated to the desired value, and performing, after the first agent-based semaphore has been updated to the desired value, one or more actions.

Another method implemented in a first agent of a device is also described. The method includes performing one or more actions of a first task involving accessing a first resource shared with a second agent of the device, and updating a first agent-based semaphore to indicate to the second agent that the first agent has completed the one or more actions of the first task and that the first agent has completed accessing the first resource.

A device is also described. The device includes a first agent executing a first thread of instructions to perform a first one or more actions for a set of multiple tasks that are performed in a particular order, and a second agent executing a second thread of instructions to perform a second one or more actions for the set of multiple tasks that are performed in the particular order. The device further includes a shared resource that is accessed by both the first agent and the second agent, the first agent updating a first agent-based semaphore to indicate to the second agent that the first agent has completed accessing the shared resource for a particular task of the set of multiple tasks, and the second agent updating a second agent-based semaphore to indicate to the first agent that the second agent has completed accessing the shared resource for the particular task.

BRIEF DESCRIPTION OF THE DRAWINGS

The same numbers are used throughout the drawings to reference like features.

DETAILED DESCRIPTION

Synchronization using agent-based semaphores is discussed herein. Different agents in a system maintain synchronization with one another when accessing a shared resource using agent-based semaphores. The different agents are typically hardware components, each executing a different thread of instructions. The different agents operate together to perform a particular set of tasks following an order of operation that is known to the agents. A set of semaphores is used between two such agents. One of the semaphores is used for a first agent to notify a second agent that the first agent has completed a particular task of the set of tasks and has completed using a shared resource for the particular task. Similarly, another of the semaphores is used for the second agent to notify the first agent that the second agent has completed a particular task of the set of tasks and has completed using the shared resource for the particular task.

Figure 1:
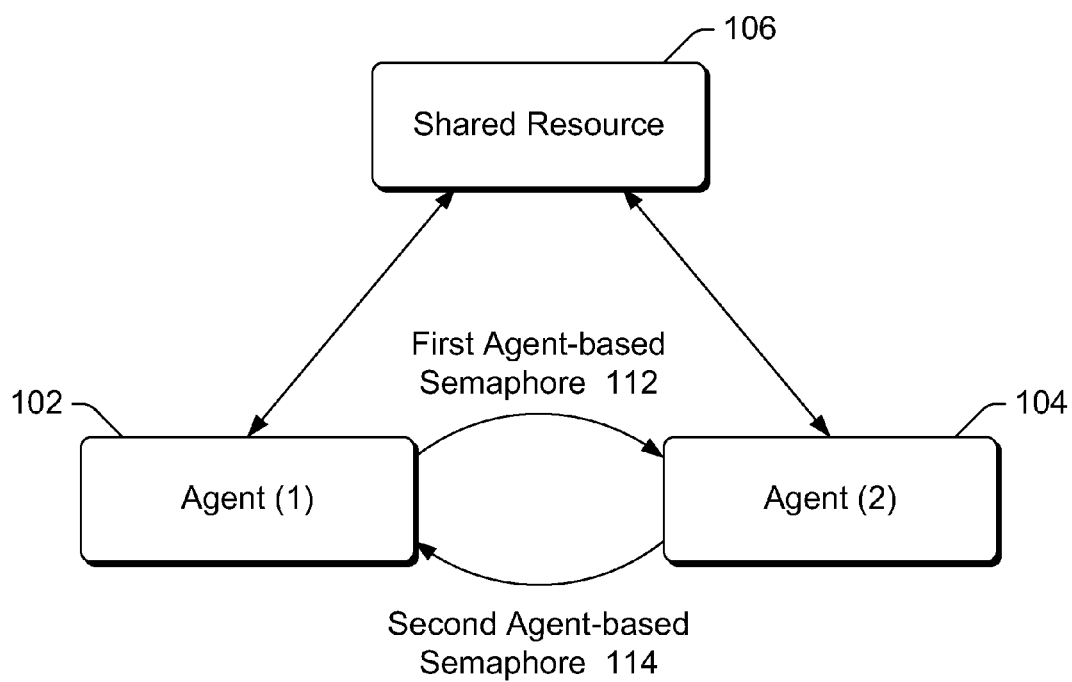
FIG. 1 is a block diagram illustrating an example system implementing the synchronization using agent-based semaphores discussed herein.

FIG. 1 is a block diagram illustrating an example system 100 implementing the synchronization using agent-based semaphores discussed herein. System 100 may include an agent 102, an agent 104, and a shared resource 106. Each agent 102 and 104 can be a hardware agent, a firmware agent, and/or a software agent. In one or more embodiments, each agent 102 and 104 is a hardware component or device that performs a particular set of tasks following an order known to both agent 102 and agent 104. These tasks are typically implemented as a thread of software instructions that are executed by the agent, but can also be implemented at least in part using firmware instructions and/or hardware. The performance of these tasks by agents 102 and 104 results in one or more particular operations being performed by system 100.

Agent 102, agent 104, and shared resource 106 can be implemented as part of the same device, or alternatively can be implemented as part of separate devices. For example, system 100 can be a computing device, in which case agent 102, agent 104, and shared resource 106 are implemented as part of the same computing device. By way of another example, system 100 can be multiple different devices, in which case one or more of agent 102, agent 104, and shared resource 106 are implemented as part of different devices.

Each agent 102 and 104 also accesses shared resource 106. Shared resource 106 can be a variety of different types of resources, such as volatile or nonvolatile memory, an output device (a printer, an image display device, audio playback device, etc.), an input device (a scanner or other image capture device, an audio recording device, etc.), a communication device (a network card, a wireless communication component, etc.), and so forth. A shared resource can be an entire component or a portion thereof. For example, a shared resource could be one or more volatile memory chips, or alternatively one or more portions of the memory on the one or more volatile memory chip.

Agents 102 and 104 synchronize their accesses to shared resource 106 using two agent-based semaphores 112 and 114. Each agent-based semaphore 112 and 114 is a counter having a set of values. Each time a semaphore 112 or 114 is updated, the semaphore is changed (e.g., incremented or decremented) to the next value in the set of values. When a semaphore 112 or 114 is at the last value in the set of values and is updated, that semaphore 112 or 114 is rolled over to the first value in the set of values.

Agents 102 and 104 each perform a particular set of tasks that involves accessing shared resource 106. This set of tasks can vary in number of tasks as well as specific tasks performed, but the set of tasks and order in which the tasks are performed is known to both agent 102 and 104. Typically, the set of tasks performed by agents 102 and 104 are the same tasks and access the same shared resource 106 (or portion thereof), although different actions can be taken in performing those tasks. Agents 102 and 104 can thus be viewed as performing different parts of each task.

For example, a particular task may be an interpolation task using data values in a particular portion of shared resource 106. Agent 102 can perform its part of the interpolation task by loading the appropriate data into the particular portion of shared resource 106. Agent 104 can perform its part of the interpolation task by generating various interpolation values based on the data in the particular portion of shared resource 106.

Agent 102 performs its part of a particular task in the set of tasks at least in part by accessing shared resource 106. When agent 102 has completed its part of the particular task, agent 102 updates semaphore 112 to indicate to agent 104 that agent 102 has completed its part of the particular task and has completed using shared resource 106 for that particular task. This updating is typically incrementing semaphore 112 by one, although the updating can alternatively be performed in different manners (incrementing by a value other than one, updating to a next value in a set of values having an ordering known to both agent 102 and 104, and so forth). Following the previous example, when agent 102 has loaded the appropriate data for the interpolation task into shared resource 106, agent 102 updates semaphore 112.

Agent 104 checks semaphore 112, and when agent 104 detects that semaphore 112 has been updated agent 104 knows that agent 102 has completed its (agent 102) part of the particular task. Agent 104 can then perform its (agent 104) part of the task, at least in part by accessing shared resource 106. Based on the updating of semaphore 112, agent 104 knows that agent 102 has completed using shared resource 106 and that agent 104 can thus safely use shared resource 106.

Agent 104 performs its part of the particular task at least in part by accessing shared resource 106. When agent 104 has completed its part of the particular task, agent 104 updates semaphore 114 to indicate to agent 102 that agent 104 has completed its part of the particular task. This updating is typically incrementing semaphore 114 by one, although the updating can alternatively be performed in different manners (incrementing by a value other than one, updating to a next value in a set of values having an ordering known to both agent 102 and 104, and so forth). Following the previous example, when agent 104 has generated the various interpolation values based on the data in shared resource 106, agent 104 updates semaphore 114.

Agent 102 checks semaphore 114, and when agent 102 detects that semaphore 114 has been updated agent 102 knows that agent 104 has completed its (agent 104) part of the particular task. Agent 102 can then perform its (agent 102) part of the next task, at least in part by accessing shared resource 106. Based on the updating of semaphore 114, agent 102 knows that agent 104 has completed using shared resource 106 and that agent 102 can thus safely use shared resource 106.

Figure 2:
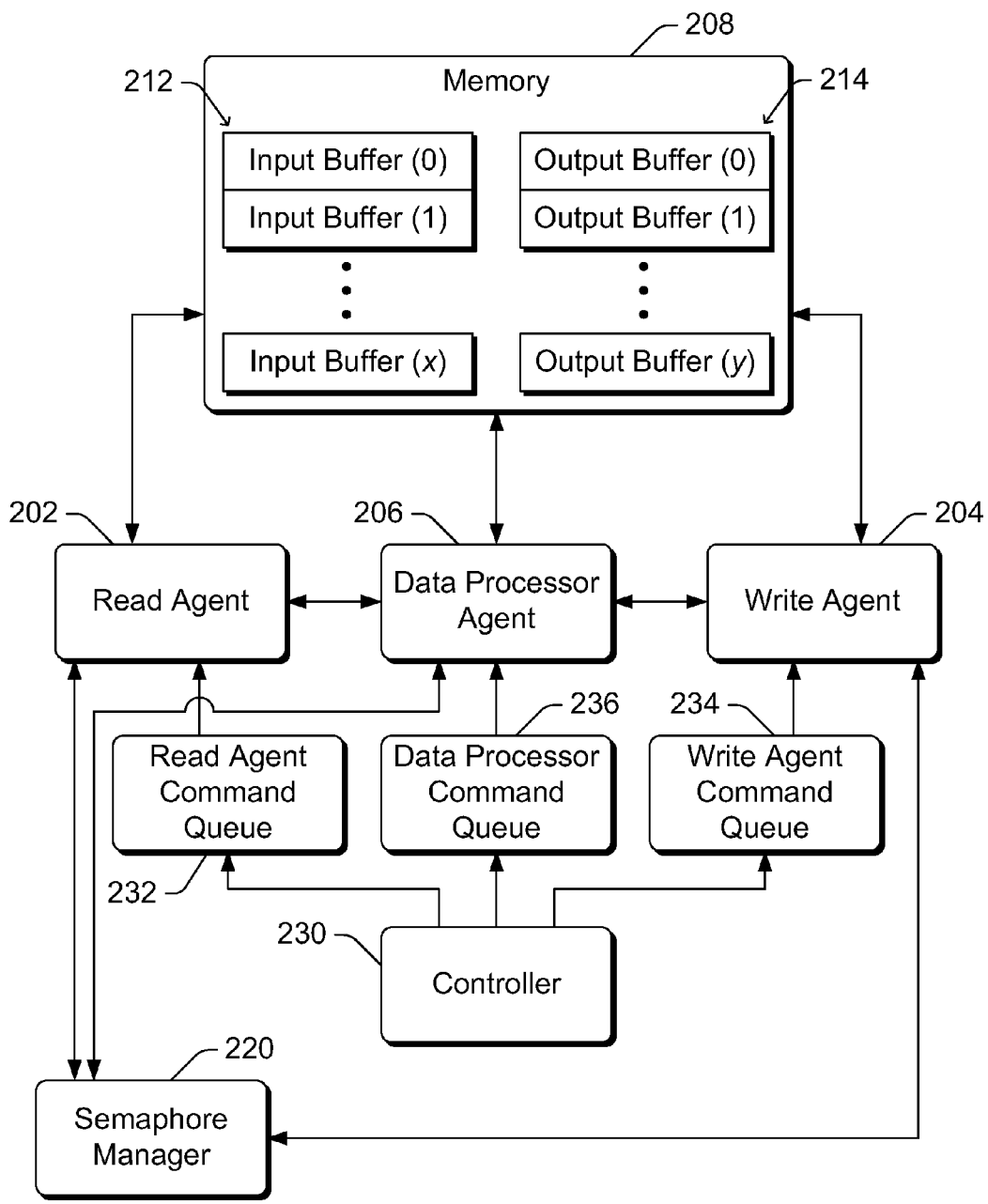
FIG. 2 is a block diagram illustrating another example system implementing the synchronization using agent-based semaphores discussed herein.

FIG. 2 is a block diagram illustrating an example system 200 implementing the synchronization using agent-based semaphores discussed herein. System 200 is discussed with examples referring to system 200 being a pixel-processing system. It is to be appreciated that a pixel-processing system is an example system 200, and that system 200 can alternatively be a variety of different other types of systems providing other types of functionality.

System 200 may include a read agent 202, a write agent 204, a data processor agent 206, and a memory 208. Each of agents 202-206 can be an agent 102 or 104 of FIG. 1. Memory 208 is a shared resource that is accessed by agents 202-206. Memory 208 can be a shared resource 106 of FIG. 1.

Each of agents 202-206 performs a particular set of tasks following an order known to agents 202-206. These tasks are typically implemented as a thread of software instructions that are executed by the agent, but can also be implemented at least in part using firmware instructions and/or hardware. The performance of these tasks results in one or more particular operations being performed by system 200.

In one or more embodiments, agents 202-206 perform a set of four tasks resulting in the pixel-processing operation of system 200. These four tasks are a transform task, an interpolation task, a compensation task, and a de-blocking task. Each of agents 202-206 performs this set of four tasks in the same order (e.g., in the order of transform, then interpolation, then compensation, and then de-blocking), even though agents 202-206 can perform different actions in performing a particular task. Agents 202-206 make use of semaphores to synchronize their accesses to memory 208 while performing these tasks as discussed in more detail below.

Memory 208 is a variety of different storage media, such as a random access memory (RAM). Memory 208 includes a set of one or more (x) input memory buffers 212 and a set of one or more (y) output memory buffers 214. Each memory buffer 212 and 214 is a portion of memory 208. The number of input memory buffers 212 and output memory buffers 214 is the same, although in one or more embodiments the number of input memory buffers 212 can be greater than or less than the number of output memory buffers. The number of input memory buffers 212 and output memory buffers 214 is also equal to the number of tasks that are performed by agents 202-206, although in other embodiments the number of buffers 212 and 214 can be less than or greater than the number of tasks that are performed by agents 202-206.

Each input buffer 212 and each output buffer 214 is associated with a particular task in a set of tasks performed by agents 202-206. Generally, read agent 202 reads in data for each of the tasks and stores the data in an input memory buffer 212 corresponding to that task. Data processor agent 206 performs one or more actions based on the data stored in an input memory buffer 212 and stores values resulting from performing the one or more actions in an output memory buffer 214 corresponding to that task. Write agent 204 obtains the data from the output memory buffer 214 corresponding to that task and writes the data out to another component or module (e.g., to control the display value of one or more pixels). Thus, memory 208 includes input buffers that are resources shared by read agent 202 and data processor agent 206, as well as output buffers that are resources shared by data processor agent 206 and write agent 204.

Read agent 202 and data processor agent 206 use two semaphores to maintain synchronization when accessing input memory buffers 212. These two semaphores are a read agent to data processor agent (raDp) semaphore and a data processor agent to read agent (dpRa) semaphore. Additionally, write agent 204 and data processor agent 206 use two semaphores to maintain synchronization when accessing output memory buffers 214. These two semaphores are a write agent to data processor agent (waDp) semaphore and a data processor agent to write agent (dpWa) semaphore.

Semaphore manager 220 makes the raDp, dpRa, waDp, and dpWa semaphores available to read agent 202, write agent 204, and data processor agent 206. Each of agents 202-206 accesses semaphore manager 220 to obtain the value of one or more of the semaphores and/or update the value of one or more of the semaphores. Semaphore manager 220 is typically included in the same device as read agent 202, write agent 204, and data processor agent 206, although alternatively can be included in a separate device. Semaphore manager 220 can be implemented in software, firmware, hardware, or combinations thereof.

In system 200, as an example, each semaphore may be a counter having a value that is updated by incrementing the semaphore by a value of one. The number of different values that the semaphore can have is the same as the number of tasks in the set of tasks performed by agents 202-206 (e.g., four in the above example). Semaphore manager 220 may increment the value in response to a request received from one of agents 202-206 to update the semaphore. In response to an update request when the value of the semaphore is at its last value, the semaphore may roll back to its first value. For example, if the number of different values that the semaphore can have is four, then the semaphore begins with a value of 0, is incremented to 1 in response to the first update request, is incremented to 2 in response to the next update request, is incremented to 3 in response to the next update request, is incremented (which is rolling over in this situation) to 0 in response to the next update request, is incremented to 1 in response to the next update request, and so forth.

As an example, consider the four tasks of transform, interpolation, compensation, and de-blocking from the examples above. The transform task refers to transforming data from one form or type to another. The interpolation task refers to using interpolation to obtain a particular value based on one or more other values. The compensation task refers to performing motion compensation based on one or more values. The de-blocking task refers to altering data of pixels in block edges to improve the display appearance of the pixels.

These four tasks are repeated by read agent 202, write agent 204, and data processor agent 206 for different data. Assume that system 200 begins with the semaphores raDp, dpRa, waDp, and dpWa being each initialized to a value of 0. Also assume that there are four input memory buffers: buffer 212(0) storing data for the transform task, buffer 212(1) storing data for the interpolation task, buffer 212(2) storing data for the compensation task, and buffer 212(3) storing data for the de-blocking task. Further assume that there are four output memory buffers: buffer 214(0) storing data for the transform task; buffer 214(1) storing data for the interpolation task; buffer 214(2) storing data for the compensation task; and buffer 214(3) storing data for the de-blocking task.

The first task is the transform task, and data for the transform task is loaded into a first input memory buffer 212(0) by read agent 202. After loading the data into buffer 212(0), read agent 202 updates the raDp semaphore to a value of 1. Data processor agent 206 is checking the value of the raDp semaphore, and identifies when the value has been updated to the value of 1. Data processor agent 206 then knows that read agent 202 has completed its part of the transform task (which is loading data into buffer 212(0)) and has completed using buffer 212(0). Data processor agent 206 can then perform its part of the transform task (which is processing the data in buffer 212(0) according to some rules, algorithms, etc.). It should be noted read agent 202 does not load new data into buffer 212(0) for the next transform task until read agent 202 determines that data processor agent 206 has completed its part of the current transform task (via the dpRa semaphore).

After data processor agent 206 has completed its part of the transform task, data processor agent 206 updates the dpRa semaphore to a value of 1. Read agent 202 is checking the value of the dpRa semaphore, and identifies when the value has been updated to the value of 1. Read agent 202 then knows that data processor agent 206 has completed its part of the transform task and has completed using buffer 212(0). Read agent 202 can then perform its part of the next transform task (which is loading data into buffer 212(0) for the next transform task that is to be performed). It should be noted that data processor agent 206 does not operate on data in buffer 212(0) for the next transform task until data processor agent 206 determines that read agent 202 has completed its part of the next transform task.

Additionally, data processor agent 206 stores output data into output memory buffer 214(0) as part of its actions in performing its part of the transform task. After storing the appropriate data into buffer 214(0), data processor agent 206 updated the dpWa semaphore to a value of 1. Write agent 204 is checking the value of the dpWa semaphore, and identifies when the value has been updated to the value of 1. Write agent 204 then knows that data processor agent 206 has completed its part of the transform task (which is processing the data in buffer 212(0) according to some rules, algorithms, etc., and storing data into buffer 214(0)) and has completed using buffer 214(0). Write agent 204 can then perform its part of the transform task (which is writing the data from buffer 214(0) out to another component or module). It should be noted that data processor agent 206 does not store new output data into buffer 214(0) for the next transform task until data processor agent 206 determines that write agent 204 has completed its part of the current transform task (via the waDp semaphore).

After writing the data from buffer 214(0) to another component or module, write agent 204 updates the waDp semaphore to a value of 1. Data processor agent 206 is checking the value of the waDp semaphore, and identifies when the value has been updated to the value of 1. Data processor agent 206 then knows that write agent 204 has completed its part of the transform task (which is writing the data from buffer 214(0) out to another component or module) and has completed using buffer 214(0). Data processor agent 206 can then store data for the next transform task into buffer 214(0).

Each of read agent 202, write agent 204 and data processor agent 206 follows the same set of four tasks (transformation, interpolation, compensation, and de-blocking) in the same order. Accordingly, by obtaining the values of the appropriate raDp, dpRa, waDp, and dpWa semaphores, a read agent 202, write agent 204 or data processor agent 206 can determine whether another of read agent 202, write agent 204 or data processor agent 206 has completed its part of a particular task. For example, if semaphore raDp has a value of 3, then data processor agent 206 knows that read agent 202 has loaded the data for the compensation task into buffer 212(2) and that data processor agent 206 can now access buffer 212(2). By way of another example, if semaphore dpRa has a value of 0, then read agent 202 knows that data processor agent 206 has completed its part of the de-blocking task and is done using the data in buffer 212(3), and that read agent 202 can now load data for the next de-blocking task into buffer 212(3). By way of yet another example, if semaphore waDp has a value of 2, then data processor agent 206 knows that write agent 204 has written out the data for the interpolation task from buffer 214(1), and that data processor agent 206 can now write data for the next interpolation task into buffer 214(1). By way of yet another example, if semaphore dpWa has a value of 1, then write agent 204 knows that data processor agent 206 has completed is part of the transform task, and that write agent 204 can now write the data from buffer 214(0) to another component or module.

Each of read agent 202, write agent 204 and data processor agent 206 repeatedly performs the same set of four tasks in the same order of transformation, interpolation, compensation, and de-blocking. When a particular one of read agent 202, write agent 204 and data processor agent 206 determines, based on the appropriate one of semaphores raDp, dpRa, waDp, and dpWa, that another of read agent 202, write agent 204 and data processor agent 206 is done using a particular memory buffer 212 or 214 for the current task, then that particular one of read agent 202, write agent 204 and data processor agent 206 can use the particular memory buffer 212 or 214 with the data for the next task.

It should be noted that each of read agent 202, write agent 204 and data processor agent 206 can be performing actions involving accessing one or more buffers 212 and/or 214 for different tasks, and that different ones of read agent 202, write agent 204 and data processor agent 206 can be operating on different ones of buffers 212 and/or 214 at the same time. However, each of read agent 202, write agent 204 and data processor agent 206 does not operate on a particular buffer 212 and/or 214 until the appropriate semaphore has been updated. For example after read agent 202 increments the raDp semaphore to a value of 2, read agent can be loading additional data into other input buffers 212(0), 212(2), and/or 212(3) while data processor agent 206 is performing its operations. But, read agent 202 does not load new data into buffer 212(1) until read agent 202 determines that data processor agent 206 has completed its part of the interpolation task. Read agent 202 makes this determination based on the dpRa semaphore being updated to a value of 2.

System 200 may also include a controller 230, a read agent command queue 232, a write agent command queue 234, and a data processor agent command queue 236. Each of queues 232, 234, and 236 is a first in, first out (FIFO) buffer into which controller 230 inputs commands. Read agent 202 retrieves commands from read agent command queue 232 in the order those commands were input to queue 232, and performs those commands. Similarly, write agent 204 retrieves commands from queue 234 in the order those commands were input to queue 234 and performs those commands, and data processor agent 206 retrieves commands from queue 236 in the order those commands were input to queue 236 and performs those commands.

Controller 230 is programmed to determine the appropriate commands to issue to each of read agent 202, write agent 204, and data processor agent 206 to carry out the desired processing of pixel data using the transformation, interpolation, compensation, and de-blocking discussed above. For example, these commands can include commands to read agent 202 identifying what data to read and/or how to read data to load into input memory buffers 212, commands to write agent 204 identifying where to write data and/or how to write data from output memory buffers 214, commands to data processor agent 206 regarding specific instructions and/or parameters for processing data in memory input buffers 212, and so forth.

One command issued by controller 230 is a semaphore check command. The semaphore check command corresponds to a particular semaphore, such as by including an identifier of the particular semaphore to be checked, by having different semaphore check commands used for different semaphores, by having a particular agent check only one semaphore, and so forth. When the semaphore check command is retrieved from a queue, the agent or processor retrieving the semaphore check command checks the corresponding semaphore. If the corresponding semaphore has the desired value, then the agent or processor retrieving the semaphore check command can proceed with its operation; otherwise, the agent or processor retrieving the semaphore check command continues to check the corresponding semaphore until the corresponding semaphore has the desired value.

For example, controller 230 issues a semaphore check command to data processor agent 206 via queue 236 to check that the raDp semaphore has been updated to a value of 1, then issues a command to data processor agent 206 via queue 236 for data processor agent to process data for the current transform task. Data processor agent 206 retrieves the semaphore check command from queue 236 and checks the raDp semaphore until the raDp semaphore has a value of 1. After the raDp semaphore has a value of 1, data processor agent 206 retrieves the next command from queue 236, which is a command to process data for the current transform task.

The desired value being checked for with a semaphore check command can be identified in the semaphore check command itself. Alternatively, the desired value can be identified in other manners. Different semaphore check commands can be used for different desired values, or the desired value can be determined by the agent or processor retrieving the semaphore check command from the queue (e.g., if the previous desired value was a value of 0, then the agent or processor retrieving the semaphore check command from the queue knows that the desired value for the next semaphore check command is a value of 1).

Alternatively, in addition to or in place of controller 230, other techniques can be used to program or otherwise configure each of agents 202, 204, and 206 with an indication of which commands to perform to carry out the desired processing of pixel data using the transformation, interpolation, compensation, and de-blocking discussed above. One such technique is to store data for the transformation, interpolation, compensation, and de-blocking in a known location and manner, allowing each of agents 202, 204, and 206 to perform the transformation, interpolation, compensation, and de-blocking tasks repeatedly with the next appropriate data. Another such technique is to have one command from controller 230 communicated to an agent 202, 204, and/or 206 that provides sufficient data or information for the agent 202, 204, and/or 206 to perform multiple transformation, interpolation, compensation, and de-blocking tasks repeatedly, each time with the next appropriate data. Yet another such technique is to program or configure an agent 202, 204, and/or 206 to perform a particular one or more actions for one task (e.g., an interpolation task) after a particular agent-based semaphore indicates that another agent 202, 204, or 206 has completed its part of another task (e.g., a transformation task).

Figure 3:
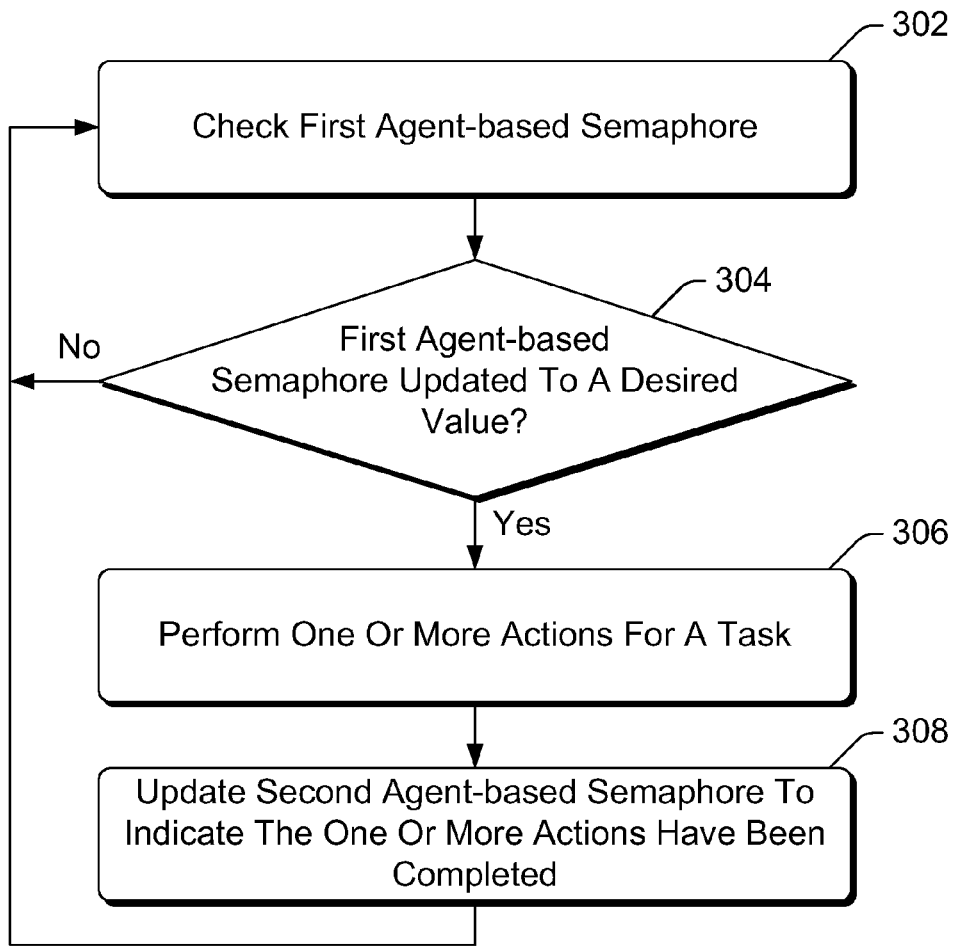
FIG. 3 is a flow chart illustrating an example method for implementing the synchronization using agent-based semaphores in accordance with one or more embodiments.

FIG. 3 is a flow chart illustrating an example method 300 for implementing the synchronization using agent-based semaphores in accordance with one or more embodiments. Method 300 is performed by an agent of a computing device, such as agent 102 or 104 of FIG. 1, or an agent 202, 204, or 206 of FIG. 2, and can be performed in software, firmware, hardware, or combinations thereof.

In method 300, the agent checks a first agent-based semaphore (step 302), and determines whether the first agent-based semaphore has been updated to a desired value (step 304). This desired value can be identified in different manners as discussed above, such as being based on a previous value of the first agent-based semaphore, being identified in a command to check the value of the first agent-based semaphore, and so forth.

The agent repeats steps 302 and 304 until the first agent-based semaphore has been updated to the desired value. After the first agent-based semaphore has been updated to the desired value, the agent performs one or more actions for a particular task (step 306). The agent determines the particular task in a variety of different manners as discussed above, such as based on an instruction received from a controller (e.g., controller 230 of FIG. 2), based on programming or configuration information included in the agent, and so forth.

After performing the one or more actions in step 306, the agent updates a second agent-based semaphore (step 308) to indicate that the agent has completed the one or more actions and has completed access to a shared resource. The agent then returns to check the first agent-based semaphore (step 302) in order to perform additional actions for additional tasks. The agent automatically returns to step 302, or alternatively returns to step 302 in response to a command from another component or module (e.g., in response to a semaphore check command received from controller 230 of FIG. 2 via a command queue).

Figure 4:
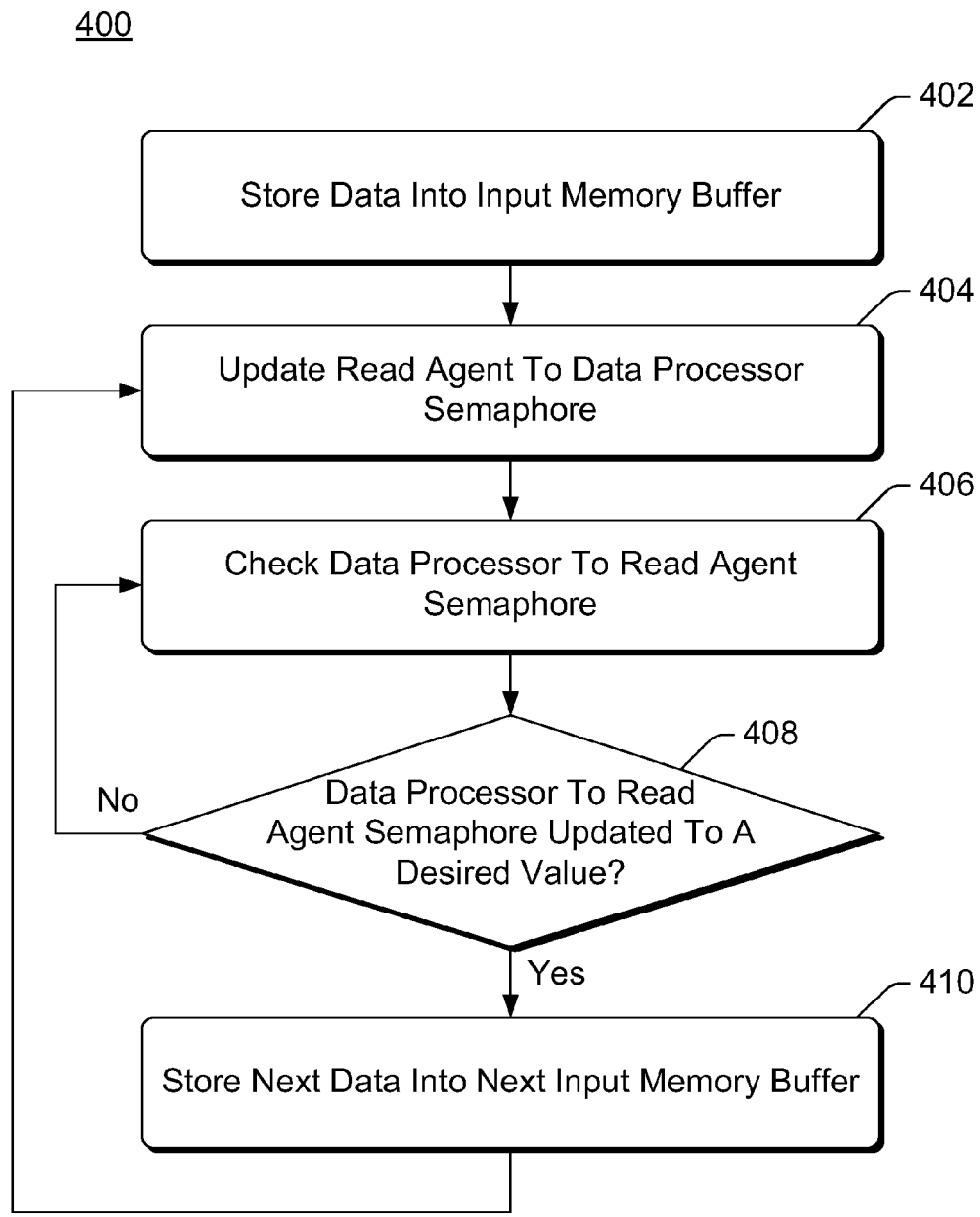
FIG. 4 is a flow chart illustrating an example method performed by a read agent implementing the synchronization using agent-based semaphores in accordance with one or more embodiments.

FIG. 4 is a flow chart illustrating an example method 400 performed by a read agent implementing the synchronization using agent-based semaphores in accordance with one or more embodiments. Method 400 is performed by a read agent of a computing device, such as read agent 202 of FIG. 2, and can be performed in software, firmware, hardware, or combinations thereof.

In method 400, the read agent stores data into an input memory buffer (step 402). The location of the data that is obtained by the read agent and/or how to obtain the data is indicated in a command received by the read agent via a read agent command queue (e.g., queue 232 of FIG. 2). Alternatively, the read agent can determine the location of the data and/or how to obtain the data in other manners, such as being pre-configured with the location of the data and/or how to obtain the data. Additionally, as discussed above different input memory buffers are associated with different tasks performed by the read agent. The read agent determines the particular input memory buffer into which the data is stored based on the particular task of a set of multiple tasks for which the read agent is currently performing actions.

After completing storing the data in the input memory buffer, the read agent updates a read agent to data processor (raDp) semaphore (step 404). The read agent also checks a data processor to read agent (dpRa) semaphore (step 406) and determines whether the dpRa semaphore has been updated to a desired value (step 408). This desired value can be identified in different manners as discussed above, such as being based on a previous value of the dpRa semaphore, being identified in a command to check the value of the dpRa semaphore, and so forth.

The agent repeats steps 406 and 408 until the dpRa semaphore has been updated to the desired value. After the dpRa semaphore has been updated to the desired value, the read agent stores the next data into the next input buffer (step 410) and updates the raDp semaphore (step 404). The agent automatically performs steps 406-410 (e.g., having been programmed or pre-configured to perform such steps), or alternatively performs steps 406-410 in response to a command from another component or module (e.g., from controller 230 of FIG. 2 via a command queue).

Figure 5:
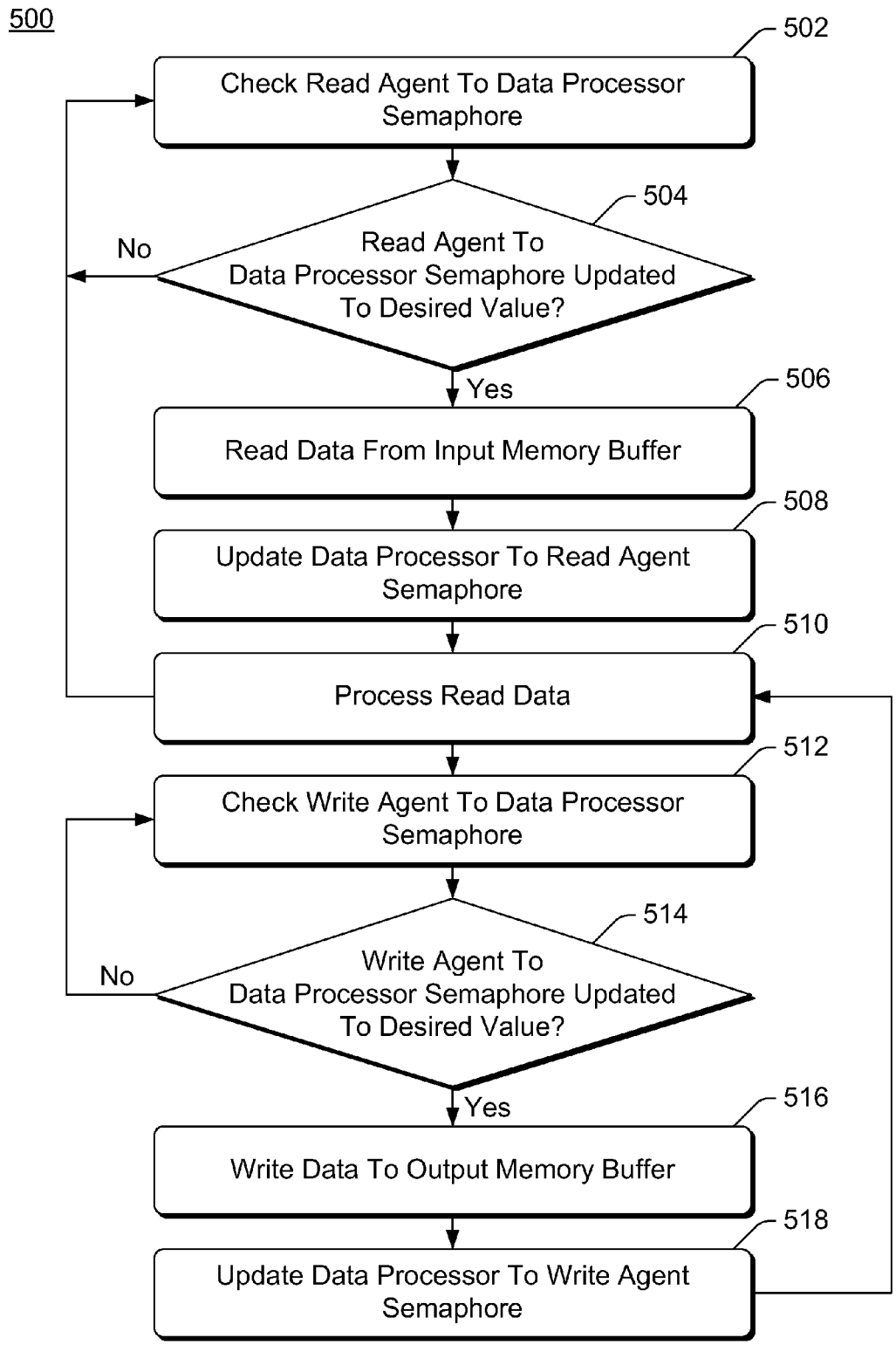
FIG. 5 is a flow chart illustrating an example method performed by a data processor agent implementing the synchronization using agent-based semaphores in accordance with one or more embodiments.

FIG. 5 is a flow chart illustrating an example method 500 performed by a data processor agent implementing the synchronization using agent-based semaphores in accordance with one or more embodiments. Method 500 is performed by a data processor agent of a computing device, such as data processor agent 206 of FIG. 2, and can be performed in software, firmware, hardware, or combinations thereof.

In method 500, the data processor agent checks a read agent to data processor (raDp) semaphore (step 502), and determines whether the raDp semaphore has been updated to a desired value (step 504). This desired value can be identified in different manners as discussed above, such as being based on a previous value of the raDp semaphore, being identified in a command to check the value of the raDp semaphore, and so forth.

The data processor agent repeats steps 502 and 504 until the raDp semaphore has been updated to the desired value. After the raDp semaphore has been updated to the desired value, the data processor agent reads data from the input memory buffer (step 506). As discussed above, different input memory buffers are associated with different tasks performed by the data processor agent. The data processor agent determines the particular input memory buffer from which the data is read based on the particular task of a set of multiple tasks for which the data processor agent is currently performing actions.

After reading the input memory buffer, the data processor agent updates a data processor to read agent (dpRa) semaphore (step 508). The data processor agent also processes the data read from the input memory buffer (step 510). This processing comprises performing one or more actions based at least in part on the data read from the input memory buffer. The specific actions performed in processing the read data can vary by implementation and based on the particular task that the data processor agent is currently performing.

The data processor agent then returns to check the raDp semaphore (step 502) in order to determine when the data processor agent can next read data from an input memory buffer. The data processor agent automatically returns to step

502, or alternatively returns to step 502 in response to a command from another component or module (e.g., from controller 230 of FIG. 2).

Additionally, the data processor agent checks a write agent to data processor (waDp) semaphore (step 512), and determines whether the waDp semaphore has been updated to a desired value (step 514). This desired value can be identified in different manners as discussed above, such as being based on a previous value of the waDp semaphore, being identified in a command to check the value of the waDp semaphore, and so forth.

The data processor agent repeats steps 512 and 514 until the waDp semaphore has been updated to the desired value. After the waDp semaphore has been updated to the desired value, the data processor agent writes data to the input memory buffer (step 516). This data that is written is a result of the processing performed by the data processor agent in step 510. As discussed above, different output memory buffers are associated with different tasks performed by the data processor agent. The data processor agent determines the particular output memory buffer to which the data is written based on the particular task of a set of multiple tasks for which the data processor agent is currently performing actions.

After reading the input memory buffer, the data processor agent updates a data processor to write agent (dpWa) semaphore (step 518). The data processor agent then returns to continue processing other data that the data processor agent has read (step 510). Alternatively, the data processor agent returns to check the waDp semaphore if the data processor agent has completed processing of the other data (step 512), or waits until the data processor agent has read the other data. The data processor agent automatically returns to step 510, or alternatively returns to step 510 in response to a command from another component or module (e.g., from controller 230 of FIG. 2).

Method 500 is described with reference to the data processor agent being able to concurrently read data from an input memory buffer and write data to an output memory buffer. In alternate embodiments, the data processor agent reads data from an input memory buffer, processes the read data, and writes the data to an output memory buffer before reading from another input memory buffer. In such embodiments, the data processor agent does not return to step 502 after step 510 and does not return to step 510 after step 518; rather, the data processor returns to step 502 after step 518.

Figure 6:
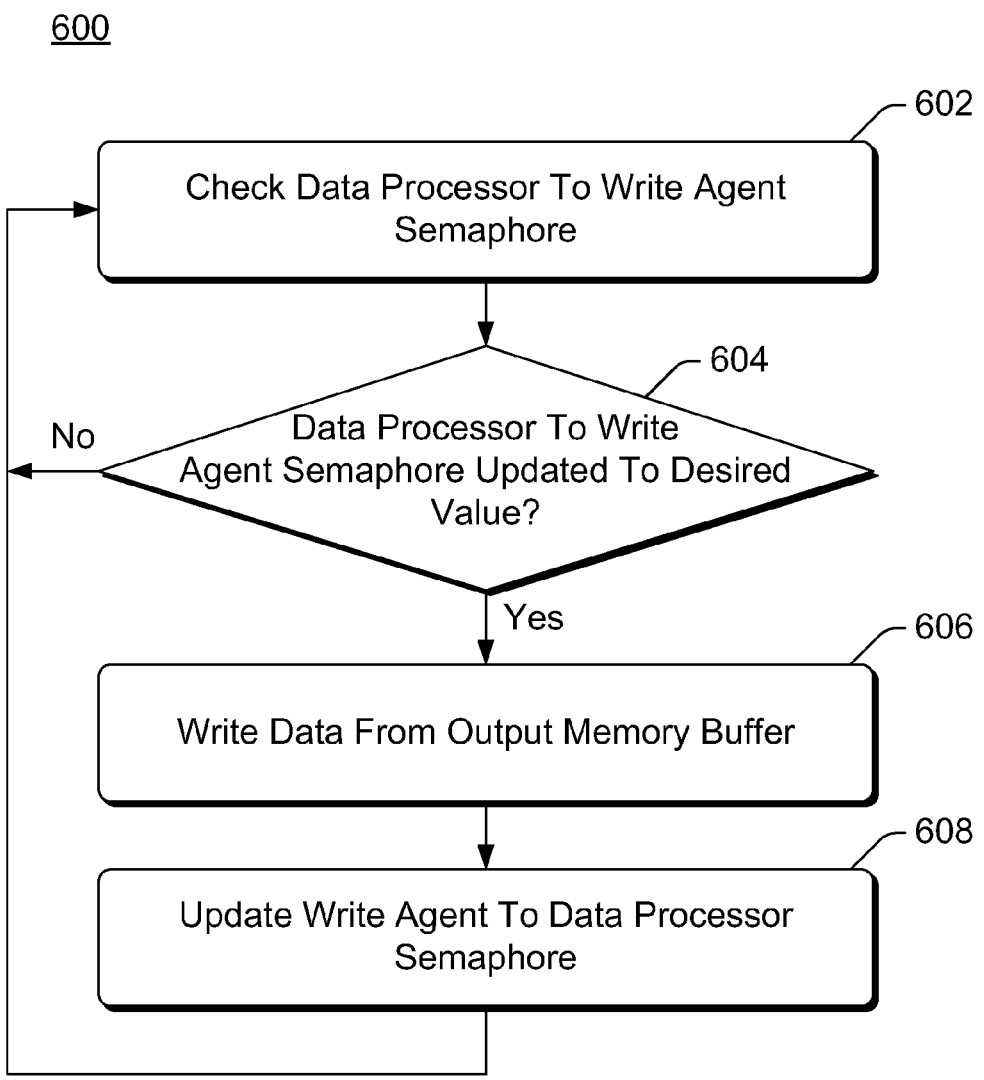
FIG. 6 is a flow chart illustrating an example method performed by a write agent implementing the synchronization using agent-based semaphores in accordance with one or more embodiments.

FIG. 6 is a flow chart illustrating an example method 600 performed by a write agent implementing the synchronization using agent-based semaphores in accordance with one or more embodiments. Method 600 is performed by a write agent of a computing device, such as write agent 204 of FIG. 2, and can be performed in software, firmware, hardware, or combinations thereof.

In method 600, the write agent checks a data processor to write agent (dpWa) semaphore (step 602), and determines whether the dpWa semaphore has been updated to a desired value (step 604). This desired value can be identified in different manners as discussed above, such as being based on a previous value of the dpWa semaphore, being identified in a command to check the value of the dpWa semaphore, and so forth.

The write agent repeats steps 602 and 604 until the dpWa semaphore has been updated to the desired value. After the dpWa semaphore has been updated to the desired value, the write agent writes data from the output memory buffer (step 606) to another component or module. As discussed above, different output memory buffers are associated with different tasks performed by the write agent. The write agent determines the particular output memory buffer from which the data is written based on the particular task of a set of multiple tasks for which the write agent is currently performing actions.

After writing data from the output memory buffer, the write agent updates a write agent to data processor (waDp) semaphore (step 608). The write agent then returns to check the dpWa semaphore (step 602) in order to determine when the write agent can next write data from an output memory buffer. The write agent automatically returns to step 602, or alternatively returns to step 602 in response to a command from another component or module (e.g., from controller 230 of FIG. 2).

Figure 7:
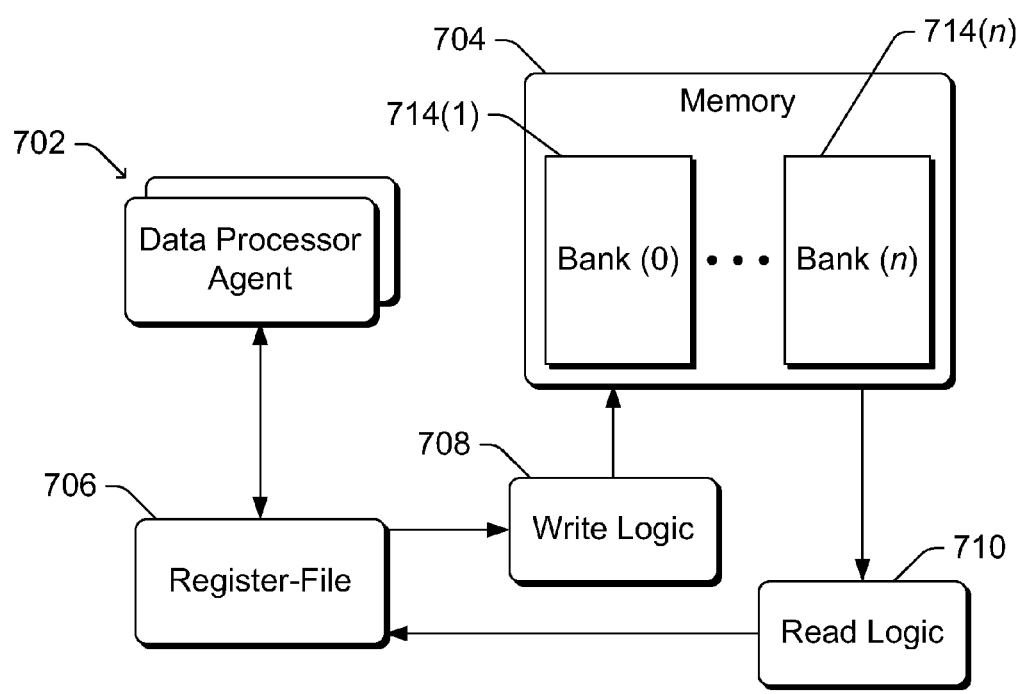
FIG. 7 is a block diagram illustrating an example data processing engine in accordance with one or more embodiments.

FIG. 7 is a block diagram illustrating an example data processing engine 700 in accordance with one or more embodiments. Data processing engine 700 may include one or more data processor agents 702, a memory 704, a register-file 706, a write logic 708, and a read logic 710. Each data processor agent 702 can be a data processor agent 206 of FIG. 2. Although two data processor agents 702 are illustrated in FIG. 7, it is to be appreciated that a single data processor agent 702 can be included in engine 700, or alternatively three or more data processor agents 702 can be included in engine 700. A read agent and write agent (e.g., read agent 202 and write agent 204 of FIG. 2) can also access memory 704, but have not been shown in FIG. 7 to avoid cluttering the drawing.

Memory 704 can be a memory 208 of FIG. 2. Memory 704 is organized into multiple (0 . . . n) banks 714 of memory. In one or more embodiments, each bank of memory is a 256× 128 bit memory bank, allowing storage of 256 128-bit memory entries. During operation, a data processor agent 702 executes instructions that can include instructions for reading data from memory 704 and writing data to memory 704. Instructions for reading data from memory 704 result in the desired data being stored in a register of register-file 706. Similarly, instructions for writing data to memory 704 result in the desired data being written from a register of register-file 706 to memory 704. Additionally, data processor agent 702 can perform various other operations on the data in the registers of register-file 706 in carrying out actions for a task, such as multiplying values, adding values, shifting values, and so forth.

Read logic 710 manages the reading of data from memory 704 and storing of the memory into a register of register-file 706. Read logic 710 can be implemented in software, firmware, hardware, or combinations thereof. Read logic 710 receives an instruction from data processor agent 702 to read from a particular memory address in memory 704 and stores the data in a particular register of register-file 706. In response to such an instruction, read logic 710 reads the data from the memory address specified by the instruction, and stores the data into the register specified by the instruction.

Similarly, write logic 708 manages the writing of data from a register of register-file 706 to memory 704. Write logic 708 can be implemented in software, firmware, hardware, or combinations thereof. Write logic 708 receives an instruction from data processor agent 702 to write data from a particular register of register-file 706 to a particular memory address in memory 704. In response to such an instruction, write logic 708 reads the data from the register specified by the instruction and writes the data to the memory address specified by the instruction.

In one or more embodiments, the memory addresses of memory 704 are mapped to particular ones of memory banks 714 by write logic 708 and read logic 710. The lower bits of the memory addresses are used by logic 708 and 710 as a bank identifier, and the remaining bits of the memory address are used to identify a location within the identified bank. The number of lower bits used varies based on the number of memory banks 714. In one or more embodiments memory 704 includes four memory banks 714, in which case the lower two bits of the memory addresses are used as the bank identifier. For example, the lower two bits of address $00000000_2$ would be 00, so address $00000000_2$ would correspond to the location of bank (0) having an address of $000000_2$. By way of another example, the lower two bits of address $01110110_2$ would be 10, so address $01110110_2$ would correspond to the location of bank (2) having an address of $011101_2$.

In one or more embodiments, the entries in memory 704 are larger than the size of data in the instructions of data processor agent 702. For example, each memory entry 704 may be 128 bits while data processor agent 702 uses instructions with 64-bit data values. Accordingly, read logic 710 can maintain a local register into which data from memory 704 is temporarily stored. If read logic 710 receives a read instruction specifying an address in memory 704 that is stored in the local register of read logic 710, then the data can be read into the register of register-file 706 from the local register of read logic 710 without needing to access memory 704. For example, in response to a first read instruction, read logic 710 reads the data from the address of memory 704 specified in the first read instruction and stores the data in both a register of register-file 706 and in the local register of read logic 710. In response to a second read instruction, read logic 710 compares the address of memory 704 specified in the first read instruction to the address of memory 704 specified in the second read instruction. If the two addresses are included in the same entry of memory 704, then read logic 710 need not access 704 to retrieve the data for the second read instruction. Rather, read logic 710 can return the data from the local register of read logic 710.

Similarly, write logic 708 can maintain a local register into which data from register-file 706 is temporarily stored. Data from two different write instructions can be collected in the local register of write logic 708 and written to memory 704 concurrently. For example, in response to a first write instruction, write logic 708 writes the data from the register of register-file 706 specified in the first write instruction into the local register of write logic 708. In response to a second write instruction, write logic 708 compares the address of memory 704 specified in the first write instruction to the address of memory 704 specified in the second write instruction. If the two addresses are included in the same entry of memory 704, then write logic 708 writes the data from the first write instruction (stored in the local register of write logic 708) and the data from the second write instruction into the memory entry of memory 704.

Figure 8:
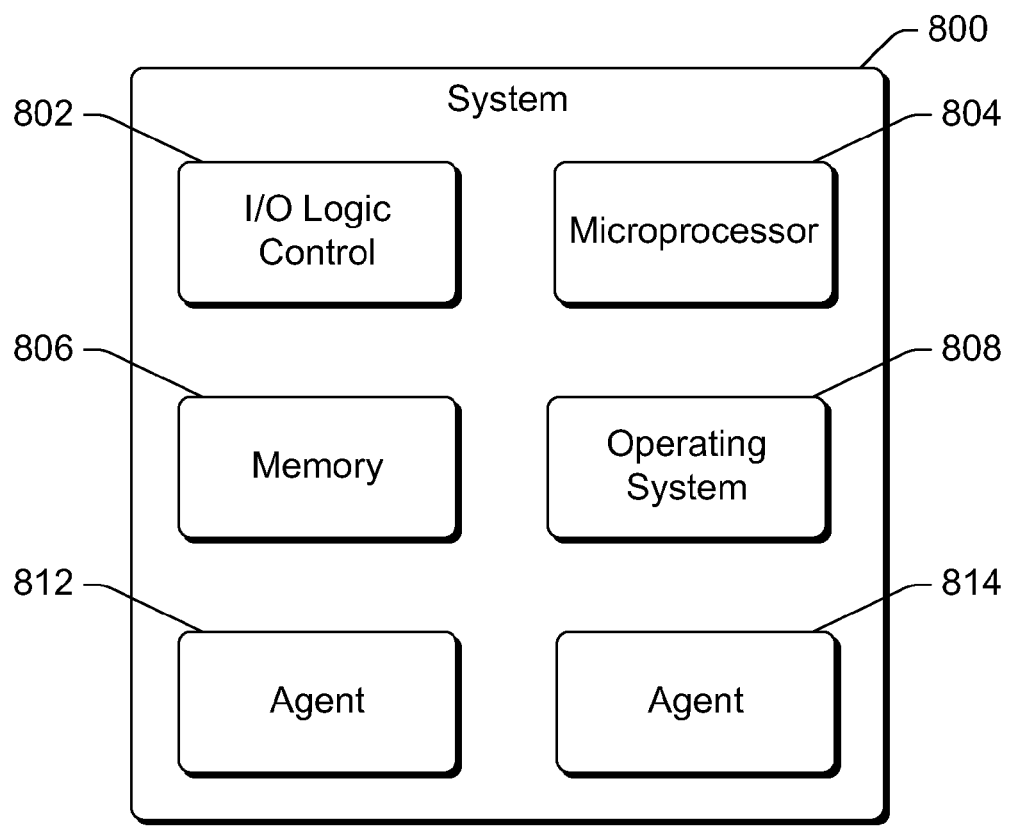
FIG. 8 illustrates an example system which can implement various embodiments described herein.

FIG. 8 illustrates an example system 800, which can implement various embodiments described above. System 800 may be implemented as a System-on-Chip (SoC) in a fixed or mobile device, such as one or a combination of a media device, computer device, television set-top box, video processing and/or rendering device, appliance device, gaming device, electronic device, vehicle, workstation, and/or in any other type of computing device.

System 800 can be integrated with electronic circuitry, a microprocessor, memory, input-output (I/O) logic control, communication interfaces and components, other hardware, firmware, and/or software to run a device. System 800 can also include an integrated data bus (not shown) that couples the various components of the system for data communication between the components. A device that includes system 800 can also be implemented with many combinations of differing components.

In this example, system 800 includes various components such as an input-output (I/O) logic control 802 (e.g., to include electronic circuitry) and a microprocessor 804 (any of a microcontroller, central processing unit (CPU), digital signal processor, etc.). System 800 also includes a memory 806, which can be any type of random access memory (RAM), a low-latency nonvolatile memory (e.g., flash memory), read only memory (ROM), and/or other suitable electronic data storage. System 800 can also include various firmware and/or software, such as an operating system 808, which can be computer-executable instructions maintained by memory 806 and executed by microprocessor 804. System 800 can also include other various communication interfaces and components, wireless LAN (WLAN) or PAN (WPAN) components, other hardware, firmware, and/or software.

System 800 includes agent 812 and agent 814. Each of agents 812 and 814 can be an agent 102 or 104 of FIG. 1, or an agent 202, 204, or 206 of FIG. 2. Examples of these various agents, and their corresponding functionality, are described above.

One or more of the methods described above can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Although the subject matter has been described in language specific to structural features and/or methodological operations, it is to be understood that the subject matter defined in the appended claims is not necessarily limited to the specific features or steps described above, including orders in which they are performed.

What is claimed is:

1. A method implemented in a first agent of a device, the method comprising:
    obtaining, via a command queue, multiple commands from a controller, wherein one of the multiple commands is a semaphore check command indicating a desired value for a semaphore;
    checking, in response to the semaphore check command, a first agent-based semaphore that is updated by a second agent of the device, wherein the first agent-based semaphore comprises a first counter having a first value;
    determining whether the first value of the first counter of the first agent-based semaphore has been updated to correspond to the desired value;
    if the first value of the first counter of the first agent-based semaphore has not been updated to correspond to the desired value, then repeatedly checking the first value of the first counter of the first agent-based semaphore until the first value of the first counter of the first agent-based semaphore is updated to correspond to the desired value; and performing, after the first value of the first counter of the first agent-based semaphore has been updated to correspond to the desired value, one or more actions.

2. A method as recited in claim 1, wherein:
the first agent-based semaphore indicates that the second agent has completed using a shared resource; and
the method further comprises
updating, after performing the one or more actions, a second agent-based semaphore to notify the second agent that the first agent has completed the one or more actions, wherein the second agent-based semaphore comprises a second counter having a second value, and wherein updating the a second agent-based semaphore comprises updating the second value of the second counter of the second agent-based semaphore.

3. A method as recited in claim 1, wherein both the first agent and the second agent each perform different actions for a same set of multiple tasks in a known order, and wherein the first agent knows which task of the set of multiple tasks has been completed by the second agent based on the first value of the first counter of the first agent-based semaphore.

4. A method as recited in claim 3, wherein the different actions performed by the first agent and the second agent include actions that access a shared memory.

5. A method as recited in claim 1, wherein the first agent is separate from the second agent, and each of the first agent and the second agent executes a different thread of instructions.

6. A method as recited in claim 1, further comprising performing the one or more actions for the first task on different data after the first value of the first counter of the first agent-based semaphore has again been updated to the desired value.

7. A method implemented in a first agent of a device, the method comprising:
obtaining, via a command queue, multiple commands from a controller, wherein one of the multiple commands is a semaphore check command indicating a desired value for a semaphore;
checking, in response to the semaphore check command, a first agent-based semaphore repeatedly until the first agent-based semaphore is updated to the desired value, wherein the first agent-based semaphore comprises a first counter having a first value that is updated by a second agent of the device;
performing, in response to the first counter of the first agent-based semaphore being set to the desired value, one or more actions of a first task involving accessing a first resource shared with the second agent of the device; and
updating a second agent-based semaphore to indicate to the second agent that the first agent has completed the one or more actions of the first task and that the first agent has completed accessing the first resource.

8. A method as recited in claim 7, wherein the first agent is separate from the second agent, and each of the first agent and the second agent executes a different thread of instructions.

9. A method as recited in claim 7, wherein the first resource is a memory accessible by both the first agent and the second agent.

10. A method as recited in claim 7, wherein the updating comprises updating the second agent-based semaphore to a value that indicates to the second agent a particular one of a set of multiple tasks that is the first task.

11. A method as recited in claim 7, wherein both the first agent and the second agent each perform different actions for a same set of multiple tasks in a known order, and wherein the second agent-based semaphore comprises a second counter having one of a particular number of different values that is equal to a number of different tasks in the set of multiple tasks.

12. A method as recited in claim 7, further comprising updating a third agent-based semaphore to indicate to a third agent of the device that the first agent has completed the one or more actions of the first task and that the first agent has completed accessing a second resource shared with the third agent.

13. A device comprising:
a first agent executing a first thread of instructions to perform a first one or more actions for a set of multiple tasks that are performed in a particular order;
a second agent executing a second thread of instructions to perform a second one or more actions for the set of multiple tasks that are performed in the particular order;
a shared resource that is accessed by both the first agent and the second agent, the first agent updating a first agent-based semaphore to indicate to the second agent that the first agent has completed accessing the shared resource for a particular task of the set of multiple tasks, and the second agent updating a second agent-based semaphore to indicate to the first agent that the second agent has completed accessing the shared resource for the particular task, wherein the first agent-based semaphore comprises a first counter having a first value and the second agent-based semaphore comprises a second counter having a second value; and
a first command queue via which the first agent obtains commands indicating how to perform the first one or more actions, the commands including a first semaphore check command indicating a particular value and effective to cause the first agent to check the second value of the second counter of the second agent-based semaphore repeatedly until the second counter of the second agent-based semaphore is updated to the particular value.

14. A device as recited in claim 13, wherein the shared resource comprises a memory, the first agent comprises a read agent for reading data into the memory, the second agent comprises a data processor agent for processing data in the memory, the first agent-based semaphore indicates a status associated with a read-agent-to-data-processor task, and the second agent-based semaphore indicates a status associated with a data-processor-to-read-agent task.

15. A device as recited in claim 13, wherein the shared resource comprises a memory, wherein the first agent comprises a data processor agent for processing data in the memory, the second agent comprises a write agent for writing data from the memory to another component, the first agent-based semaphore indicates a status associated with a data-processor-to-write-agent task, and the second agent-based semaphore indicates a status associated with a write-agent-to-data-processor task.

16. A device as recited in claim 13, further comprising:
a second command queue via which the second agent obtains commands, the commands indicating how to perform the second one or more actions, the commands including a second semaphore check command effective to cause the second agent to repeatedly check the first value of the first counter of the first agent-based semaphore until the first counter of the first agent-based semaphore is updated to the particular value.

17. A device as recited in claim 13, wherein the shared resource comprises one memory buffer of multiple memory buffers, and wherein the multiple memory buffers includes a different memory buffer associated with each task in the set of multiple tasks.

18. A device as recited in claim 13, wherein the device is implemented as a System-on-Chip (SoC).

19. A device as recited in claim 13, wherein the first agent knows which task of the set of multiple tasks has been completed by the second agent based on the second value of the second counter of the second agent-based semaphore.

20. A device as recited in claim 13, wherein the set of multiple tasks includes a transform task, an interpolation task, a compensation task, or a de-blocking task.

* * * * *